(12) United States Patent
Cha et al.

(10) Patent No.: US 11,860,765 B2
(45) Date of Patent: Jan. 2, 2024

(54) METHOD AND SYSTEM FOR FUZZING WINDOWS KERNEL BY UTILIZING TYPE INFORMATION OBTAINED THROUGH BINARY STATIC ANALYSIS

(71) Applicant: KOREA ADVANCED INSTITUTE OF SCIENCE AND TECHNOLOGY, Daejeon (KR)

(72) Inventors: Sang Kil Cha, Daejeon (KR); Jaeseung Choi, Daejeon (KR); Daejin Lee, Daejeon (KR); Kangsu Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 160 days.

(21) Appl. No.: 17/520,414

(22) Filed: Nov. 5, 2021

(65) Prior Publication Data
US 2023/0051654 A1 Feb. 16, 2023

(30) Foreign Application Priority Data
Aug. 13, 2021 (KR) .......... 10-2021-0107282

(51) Int. Cl.
G06F 11/00 (2006.01)
G06F 11/36 (2006.01)
G06F 11/34 (2006.01)
G06F 11/30 (2006.01)

(52) U.S. Cl.
CPC ........ *G06F 11/3636* (2013.01); *G06F 11/302* (2013.01); *G06F 11/3461* (2013.01); *G06F 11/3692* (2013.01)

(58) Field of Classification Search
CPC ............... G06F 11/302; G06F 11/3461; G06F 11/3636; G06F 11/3692
See application file for complete search history.

(56) References Cited

U.S. PATENT DOCUMENTS

| 9,530,007 | B1 * | 12/2016 | Allen | G06F 11/3688 |
| 10,983,901 | B1 * | 4/2021 | Pearce | G06F 11/3688 |
| 2017/0075784 | A1 * | 3/2017 | Nakanishi | G06F 11/3692 |
| 2019/0294537 | A1 * | 9/2019 | Bond | G06F 11/3664 |
| 2021/0216435 | A1 * | 7/2021 | Godefroid | G06F 11/3684 |

(Continued)

OTHER PUBLICATIONS

Jain, Vivek, Sanjay Rawat, Cristiano Giuffrida, and Herbert Bos. "TIFF: using input type inference to improve fuzzing." In Proceedings of the 34th Annual Computer Security Applications Conference, pp. 505-517. 2018. https://doi.org/10.1145/327469.*

(Continued)

*Primary Examiner* — Joshua P Lottich
(74) *Attorney, Agent, or Firm* — LRK PATENT LAW FIRM (57) ABSTRACT

Disclosed is a window kernel fuzzing technique utilizing type information obtained through binary static analysis. The method of fuzzing a kernel of a computer operating system performed by a fuzzing system may include the steps of: automatically inferring type information of a system call using a library file provided by the computer operating system; and performing system call fuzzing on the basis of the type information of the system call obtained through the inference.

20 Claims, 6 Drawing Sheets

(56) References Cited

U.S. PATENT DOCUMENTS

2022/0019926 A1* 1/2022 Yun .................. G06N 7/023
2022/0164277 A1* 5/2022 Menashe ............ G06F 11/3688

OTHER PUBLICATIONS

Kim, Kyungtae, Dae R. Jeong, Chung Hwan Kim, Yeongjin Jang, Insik Shin, and Byoungyoung Lee. "HFL: Hybrid Fuzzing on the Linux Kernel." In NDSS. 2020 . . . https://https://lifeasageek.github.io/papers/kim-hfl.pdf.*

Jake Corina et al., "DIFUZE: Interface Aware Fuzzing for Kernel Drivers", Session J2: Fun with Fuzzing, CCS'17, October 30-Nov. 3, 2017, Dallas, Tx, USA.

Sergej Schumilo et al., "KAFL: Hardware-Assisted Feedback Fuzzing for OS Kernels", 26th USENIX Security Symposium, Aug. 16-18, 2017 . Vancouver, BC, Canada.

Shankara Pailoor et al., "MoonShine: Optimizing OS Fuzzer Seed Selection with Trace Distillation", 27th USENIX Security Symposium, Aug. 15-17, 2018 . Baltimore, Md, USA.

Dae R. Jeong et al., "RAZZER: Finding Kernel Race Bugs through Fuzzing", 2019 IEEE Symposium on Security and Privacy (SP), 2019.

Jaeseung Choi, et al., "NTFUZZ: Enabling Type-Aware Kernel Fuzzing on Windows with Static Binary Analysis", 2021 IEEE Symposium on Security and Privacy (SP), 2021.

* cited by examiner

$$
\begin{aligned}
exp \quad &::= \quad reg &&\text{// Register} \\
&\phantom{::=} \mid [\, exp\, ] &&\text{// Memory load} \\
&\phantom{::=} \mid int &&\text{// Number} \\
&\phantom{::=} \mid exp \diamond_b exp &&\text{// Binary operation} \\
stmt \quad &::= \quad \text{Put}\,(reg,\, exp) \\
&\phantom{::=} \mid \text{Store}\,(exp,\, exp) \\
&\phantom{::=} \mid \text{Call}\,(f)
\end{aligned}
$$

FIG. 6

$$
\begin{aligned}
\text{(Abstract Integer)} \quad &\mathbb{I} &&= \quad a * symbol + b \mid \bot \mid \top \\
\text{(Abstract Location)} \quad &\mathbb{L} &&= \quad \text{Global}(\mathbb{Z}) \\
& && \quad \mid \text{Stack}(function \times \mathbb{Z}) \\
& && \quad \mid \text{Heap}(allocsite \times \mathbb{Z}) \\
& && \quad \mid \text{SymLoc}(symbol \times \mathbb{Z}) \\
\text{(Type Constraint)} \quad &\mathbb{T} &&= \quad \tau \\
& && \quad \mid \text{SymTyp}(symbol) \\
\text{(Abstract Value)} \quad &\mathbb{V} &&= \quad \mathbb{I} \times 2^{\mathbb{L}} \times 2^{\mathbb{T}} \\
\text{(Register Map)} \quad &\mathbb{R} &&= \quad reg \to \mathbb{V} \\
\text{(Memory)} \quad &\mathbb{M} &&= \quad \mathbb{L} \to \mathbb{V} \\
\text{(Abstract State)} \quad &\mathbb{S} &&= \quad \mathbb{R} \times \mathbb{M}
\end{aligned}
$$

FIG. 7

$$\mathcal{V}(reg)(S) = S[0](reg)$$
$$\mathcal{V}([e])(S) = \bigsqcup \{S[1](l) \mid l \in \mathcal{V}(e)(S)[1]\}$$
$$\mathcal{V}(i)(S) = \begin{cases} (0, \phi, \phi) & \text{if } i = 0 \\ (\bot, \{\text{Global}(i)\}, \phi) & \text{if } i \text{ in data section} \\ (i, \phi, \{integer\}) & \text{otherwise} \end{cases}$$
$$\mathcal{V}(e_1 \Diamond_b e_2)(S) = binop(\Diamond_b, e_1, e_2, S)$$

(a) Evaluation of expressions (*exp*).

$$\mathcal{F}(\text{Put}(r, e))(S) = (R[r \mapsto \mathcal{V}(e)(S)], M), \text{ where } S = (R, M)$$
$$\mathcal{F}(\text{Store}(e_1, e_2))(S) = (R, update(\mathcal{V}(e_1)(S)[1])(\mathcal{V}(e_2)(S))(M)),$$
$$\text{where } S = (R, M)$$
$$update(L)(v)(M) = \begin{cases} M[l \mapsto v] & \text{if } L = \{l\} \\ M[l_1 \xmapsto{w} v]...[l_n \xmapsto{w} v] & \text{if } L = \{l_1, ..., l_n\} \end{cases}$$
$$\mathcal{F}(\text{Call}(f))(S) = \begin{cases} apply(\delta, S) & \text{if } f \text{ has side effect } \delta \\ S & \text{otherwise} \end{cases}$$

(b) Evaluation of statements (*stmt*).

FIG. 8

METHOD AND SYSTEM FOR FUZZING WINDOWS KERNEL BY UTILIZING TYPE INFORMATION OBTAINED THROUGH BINARY STATIC ANALYSIS

CROSS-REFERENCE TO RELATED APPLICATION

This application claims priority under 35 U.S.C. § 119 to Korean Patent Application No. 10-2021-0107282, filed on Aug. 13, 2021, the disclosure of which is incorporated herein by reference in its entirety.

BACKGROUND OF THE INVENTION

1. Field of the Invention

The present invention relates to a method of fuzzing the kernel of the Windows operating system by utilizing type information obtained through binary static analysis, and a system implementing the same.

2. Description of Related Art

A kernel is a core element of a computer operating system, which performs a function of handling a great many requests (e.g., file input and output) transmitted from applications executed in a computer. Interfaces for sending and receiving these requests are functions called as system calls, and the operating system defines and provides various types of system calls for applications. When an application sends a request by calling a system call, the kernel code is executed to process the request.

When an error (bug) occurs while the kernel code processes a system call, it may generate a serious problem. For example, the computer may stop working and will be shut down, and the blue screen of death observed in Windows is a phenomenon corresponding thereto. As another problem, a malicious hacker may launch an attack of stealing administrator privileges using the error.

The most widely used one among the techniques of detecting errors in the kernel code in advance is a fuzzing technique. Fuzzing is a technique of detecting software errors by repeatedly executing the software while randomly mutating software inputs. The kernel code receives input through a system call. Kernel fuzzing means repeatedly executing the kernel while randomly mutating parameters of the system call. For this reason, kernel fuzzing is sometimes referred to as system call fuzzing.

It is very important to utilize type information of system call parameters in the process of system call fuzzing. For example, efficient fuzzing is possible only when it is known whether a system call receives a pointer type parameter or an integer type parameter and a mutation appropriate to the parameter type is performed.

Although information on the types of system call parameters is open in the case of open-source operating systems such as Linux, only an extremely small part is open in the case of commercial operating systems such as Windows. For example, although there are 1,600 or more system calls in the case of Windows 10, as of 2021, only 64 system calls are documented on the official website of Microsoft.

For this reason, most of current kernel fuzzing studies are targeting the Linux operating system, of which information on the types of system calls is open. Although some techniques study the kernel fuzzing targeting the commercial operating systems such as Windows, one of the few officially documented system calls is studied as the target of fuzzing, and in order to apply the kernel fuzzing to undocumented system calls, a person himself or herself should analyze and provide information on the types of system calls. It is very difficult in reality to individually apply this manual process to a great many system calls existing in Windows.

PRIOR ART DOCUMENTS

Non-Patent Documents

J. Corina, A. Machiry, C. Salls, Y. Shoshitaishvili, S. Hao, C. Kruegel, and G. Vigna, "DIFUZE: Interface aware fuzzing for kernel drivers," in Proceedings of the ACM Conference on Computer and Communications Security, 2017, pp. 2123-2138.

S. Pailoor, A. Aday, and S. Jana, "MoonShine: Optimizing OS fuzzer seed selection with trace distillation," in Proceedings of the USENIX Security Symposium, 2018, pp. 729-743.

D. R. Jeong, K. Kim, B. Shivakumar, B. Lee, and I. Shin, "Razzer: Finding kernel race bugs through fuzzing," in Proceedings of the IEEE Symposium on Security and Privacy, 2019, pp. 754-768.

S. Schumilo, C. Aschermann, R. Gawlik, S. Schinzel, and T. Holz, "kAFL: Hardware-assisted feedback fuzzing for OS kernels," in Proceedings of the USENIX Security Symposium, 2017, pp. 167-182.

SUMMARY OF THE INVENTION

Therefore, the present invention has been made in view of the above problems, and it is an object of the present invention to provide a method and system for automatically inferring type information of Windows system calls through a static analysis technique and fuzzing the system calls using the type information obtained through the inference.

To accomplish the above object, according to one aspect of the present invention, there is provided a method of fuzzing a kernel of a computer operating system performed by a fuzzing system, the method comprising the steps of: automatically inferring type information of a system call using a library file provided by the computer operating system; and performing system call fuzzing on the basis of the type information of the system call obtained through the inference.

The computer operating system may include a Windows operating system that does not open a source code and type information of system calls, and the inferring step may include the step of receiving the library file provided by the Windows operating system, calling an API function defined in the received library file by an application, and performing a system call that transmits a request to the kernel through the called API function, and the library file provided by the Windows operating system may be provided as a binary code of a compiled form.

The inferring step may include the step of inferring type information of a system call, to which each parameter of the API function is passed, through static analysis of a function call flow occurring in the library file provided by the Windows operating system.

The inferring step may include the step of converting the library file provided by the Windows operating system into an intermediate language form for static analysis.

The inferring step may include the step of detecting functions existing in the library file provided by the Windows operating system, and converting a machine code included in the detected functions into an assembly code.

The inferring step may include the step of identifying relation information between the detected functions and other functions called from each of the detected functions, generating a function call graph on the basis of the identified relation information, and determining an order to analyze a called function before a calling function on the basis of the generated function call graph.

The inferring step may include the step of analyzing behavior information including system calls and memory update occurring in each function, and generating a summary including the analyzed behaviors.

The inferring step may include the step of inferring type information of each system call by synthesizing parameter information passed to the system call on the basis of the summary information collected for each function.

The step of performing system call fuzzing may include the step of outputting an error result of searching for a kernel error using the acquired type information of the system call and a seed application, wherein the seed application may be arbitrary software executed on the Windows operating system.

The step of performing system call fuzzing may include the step of collecting seed application information related to the number of system calls generated by one execution of the seed application.

The step of performing system call fuzzing may include the step of executing the seed application.

The step of performing system call fuzzing may include the step of intercepting content of the system call generated by the seed application, and randomly mutating parameter values of the intercepted content of the system call.

The step of performing system call fuzzing may include the step of determining a ratio for mutating the parameter values of the content of the system call on the basis of execution progress of the seed application.

The execution progress of the seed application may be derived on the basis of an average number of system calls called while the seed application is executed and the number of system calls currently called by the seed application.

The step of performing system call fuzzing may include the step of mutating the parameter values of the intercepted content of the system call by utilizing the type information of the system call.

The step of performing system call fuzzing may include the step of passing the parameter values of the content of the mutated system call to the kernel, and observing whether an error occurs in a kernel code.

The step of performing system call fuzzing may include the step of repeating execution of the seed application when the kernel error does not occur and execution of the seed application is normally completed.

The step of performing system call fuzzing may include the step of rebooting the system and automatically generating memory dump when the kernel error occurs, and storing and reporting information on the kernel error when the kernel error and system rebooting are confirmed.

There is provided a computer program stored in a non-transitory computer-readable recording medium for executing a method of fuzzing a kernel of a computer operating system in a fuzzing system.

There is provided a fuzzing system comprising: a type reasoner for automatically inferring type information of a system call using a library file provided by a computer operating system; and a type-based fuzzer for performing system call fuzzing on the basis of the type information of the system call obtained through the inference.

DETAILED DESCRIPTION OF THE PREFERRED EMBODIMENT

Hereinafter, an embodiment of the present invention will be described in detail with reference to the accompanying drawings.

Figure 1:
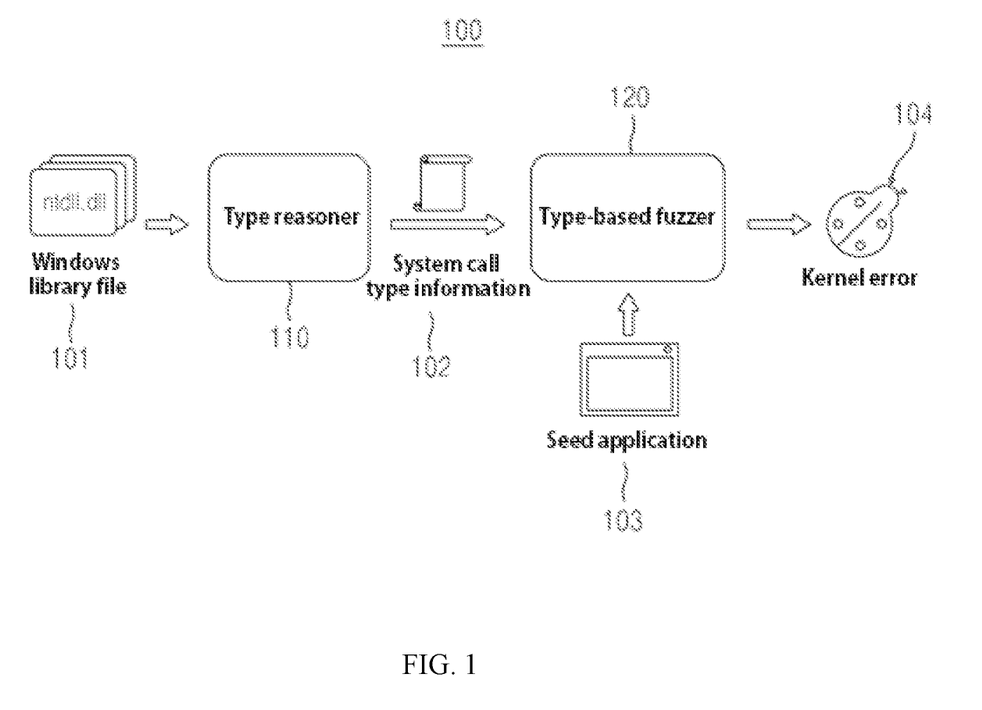
FIG. 1 is a view for explaining the general operation of a fuzzing system according to an embodiment of the present invention.

FIG. 1 is a view showing the overall structure of a fuzzing system 100 according to an embodiment of the present invention. The overall operation of the fuzzing system will be described with reference to FIG. 1. The fuzzing system according to the present invention may include a type reasoner 110 for automatically inferring type information of system calls, and a type-based fuzzer 120 for performing system call fuzzing using the type information obtained through the inference.

Figure 3:
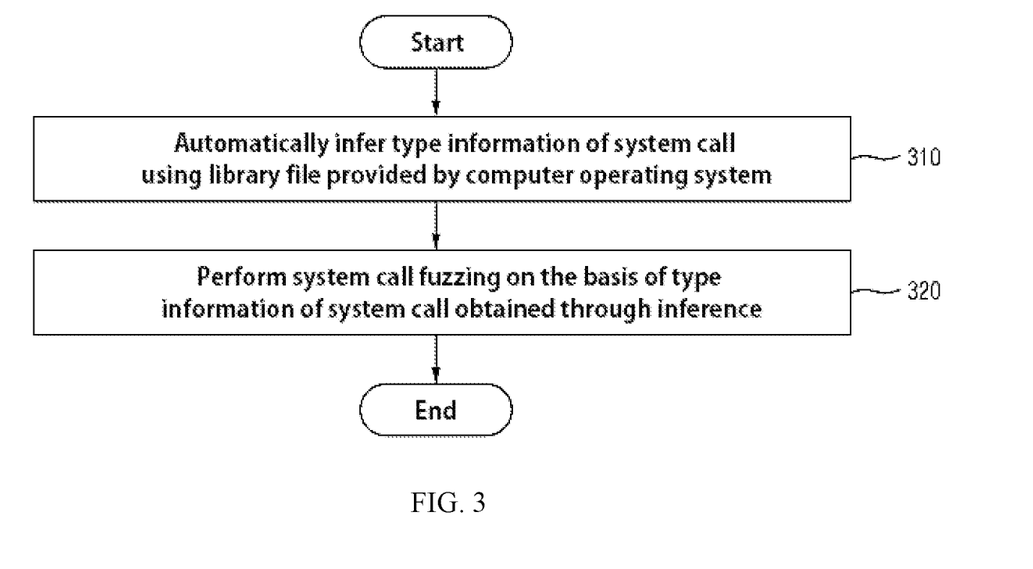
FIG. 3 is a flowchart illustrating a method of fuzzing the kernel of a computer operating system in a fuzzing system according to an embodiment of the present invention.

For the description of FIG. 1, FIG. 3 is referred to first.

At step 310 of FIG. 3, the type reasoner 110 may automatically infer type information of a system call using a library file provided by a computer operating system. At this point, the computer operating system may include Linux-based operating systems that open the source code and type information of system calls, or Windows operating systems that do not open the source code and type information of system calls. In the embodiment according to the present invention, kernel fuzzing operation of the Windows operating systems that do not open the source code and type information of system calls will be described. For example, the type reasoner 110 may automatically infer types of Windows system calls. The type reasoner 110 may receive a library file 101 provided by the Windows operating system and infer type information 102 of system calls.

At step 320 of FIG. 3, the type-based fuzzer 120 may perform system call fuzzing on the basis of the type information of system calls obtained through the inference. The type-based fuzzer 120 may receive the type information 102 of system calls and a seed application 103, finally search for a kernel error 104, and output the searched kernel error 104 as a result.

Figure 2:
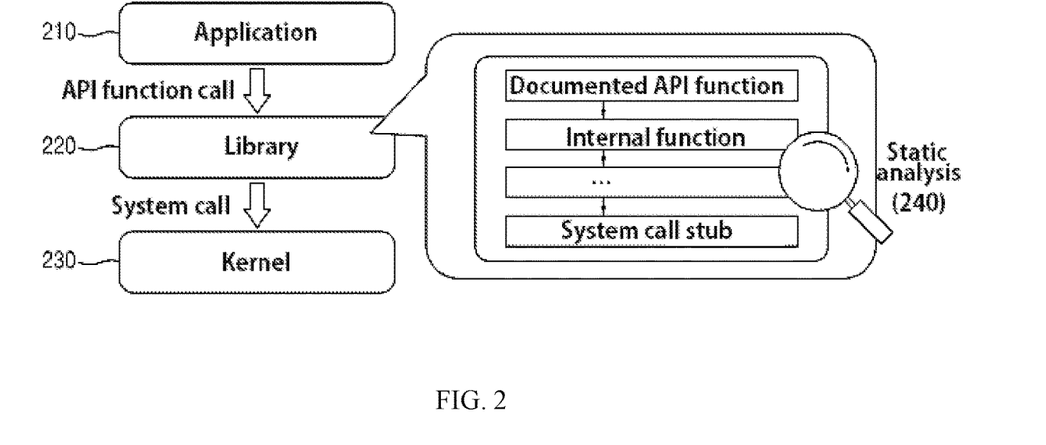
FIG. 2 is a view for explaining the operation of calling a system call according to an embodiment of the present invention.

FIG. 2 is a view for explaining the operation of calling a system call according to an embodiment of the present invention.

In FIG. 2, an application 210 calls an API function defined in a library file provided by a computer operating system (e.g., Windows). Then, the called API function goes through a series of internal function calls, finally reaches a system call stub, and makes a system call that sends a request to the kernel 230 at the reached system call stub.

For example, when the library file is provided by the Windows operating system, the source code is not open, and only a binary code obtained by compiling the source code is provided. In this case, since application developers should be able to call the API function, information on API functions that exist and types of function parameters are formally documented.

In FIG. 2, the type reasoner 110 may observe the function call flow occurring in the library file using a static analysis 240 technique. Static analysis means an automated technique that makes a rough estimate of what will happen in the software without actually executing the software.

The type reasoner 110 may determine a system call to which each parameter of the API function is passed, through the static analysis. The type reasoner 110 may infer type information of a system call, i.e., the type of each parameter of the system call, through the officially documented API function information.

Figure 4:
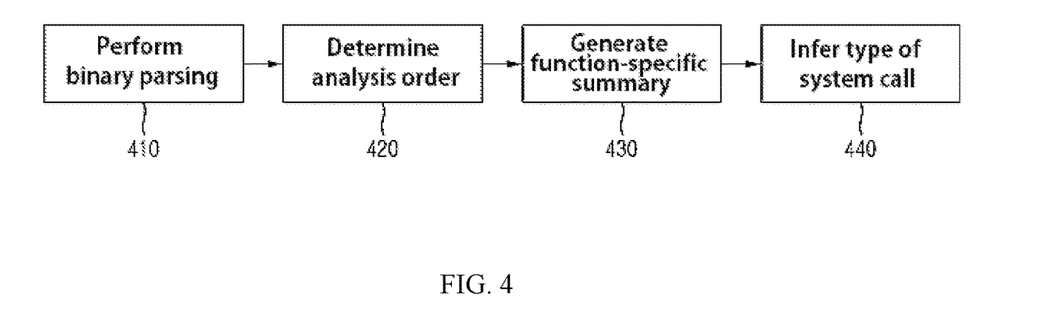
FIG. 4 is a view for explaining the operation of inferring type information of a system call in a fuzzing system according to an embodiment of the present invention.

FIG. 4 is a view for explaining the operation of inferring type information of a system call by the type reasoner 110. The type reasoner 110 may perform the steps of binary parsing 410, analysis order determination 420, function-specific summary generation 430, and system call type inference 440. Hereinafter, the operation of inferring a call type of the Windows system performed by the type reasoner 110 will be described.

At the binary parsing 410 step of FIG. 4, the type reasoner 110 may read and convert the Windows library file into an intermediate language form for static analysis. Specifically, the type reasoner 110 may first detect the functions existing in the library file, and then convert the machine instruction code included in each function into an assembly code. The type reasoner 110 may express the code of each function in an intermediate language by converting the assembly code into the intermediate language.

The binary parsing 410 step may be implemented by utilizing a binary analysis platform. A binary analysis platform referred to as B2R2 disclosed in the non-patent document of "M. Jung, S. Kim, H. Han, J. Choi, and S. K. Cha, 'B2R2: Building an efficient front-end for binary analysis,' in Proceedings of the NDSS Workshop on Binary Analysis Research, 2019" may be referenced as the binary analysis platform.

Figure 6:
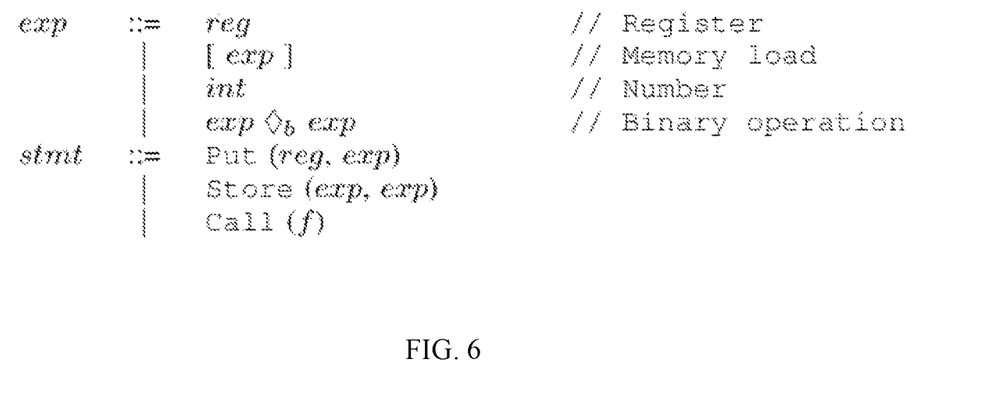
FIG. 6 is a view showing a result of organizing the structure of a converted intermediate language according to an embodiment of the present invention.

FIG. 6 is a view showing a brief summary of the structure (syntax) of the converted intermediate language. In the process of converting into an intermediate language, since the execution flow information of the program is separately collected to generate a control-flow graph, instructions related to the program execution flow are omitted in the drawings.

At the analysis order determination 420 step of FIG. 4, the type reasoner 110 may determine an order of analyzing functions detected with respect to the detected functions. The type reasoner 110 may identify relation information between the detected functions and certain other functions called from each of the detected functions, and may generate a function call graph on the basis of the identified relation information. The type reasoner 110 may determine an order to analyze a called function (callee function) before a calling function (caller function) on the basis of the generated function call graph (topological ordering).

At the function-specific summary generation 430 step of FIG. 4, the type reasoner 110 may analyze behavior information including system calls and memory update occurring in each function using a modular analysis technique, and generate a summary including the analyzed behaviors. As the modular analysis technique, the method disclosed in the non-patent document of "A. Aiken, S. Bugrara, I. Dillig, T. Dillig, B. Hackett, and P. Hawkins, 'An overview of the saturn project,' in Proceedings of the ACM SIGPLAN-SIGSOFT workshop on Program Analysis for Software Tools and Engineering, 2007, pp. 43-48" may be referenced. When a function calls another function and a summary of the called function has already been generated, which system call the function call generates and how the function call changes the memory are identified using the summary that has already been generated without the need of repeatedly analyzing the called function. In order to reuse the summary in this way, the called function should be analyzed and summarized before the calling function, and thus the function analysis order determination 420 step described above should be preceded. The reason of generating and reusing the summary is to reduce the cost of analysis. When the called function is repeatedly analyzed whenever a function call occurs, the cost of analysis increases dramatically.

Figure 7:
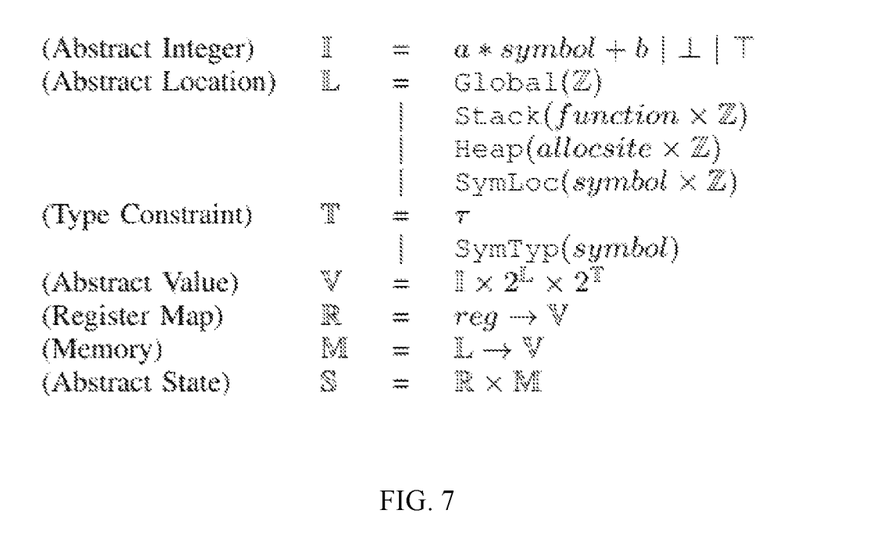
FIGS. 7 and 8 are views for explaining static analysis according to an embodiment of the present invention.
Figure 8:
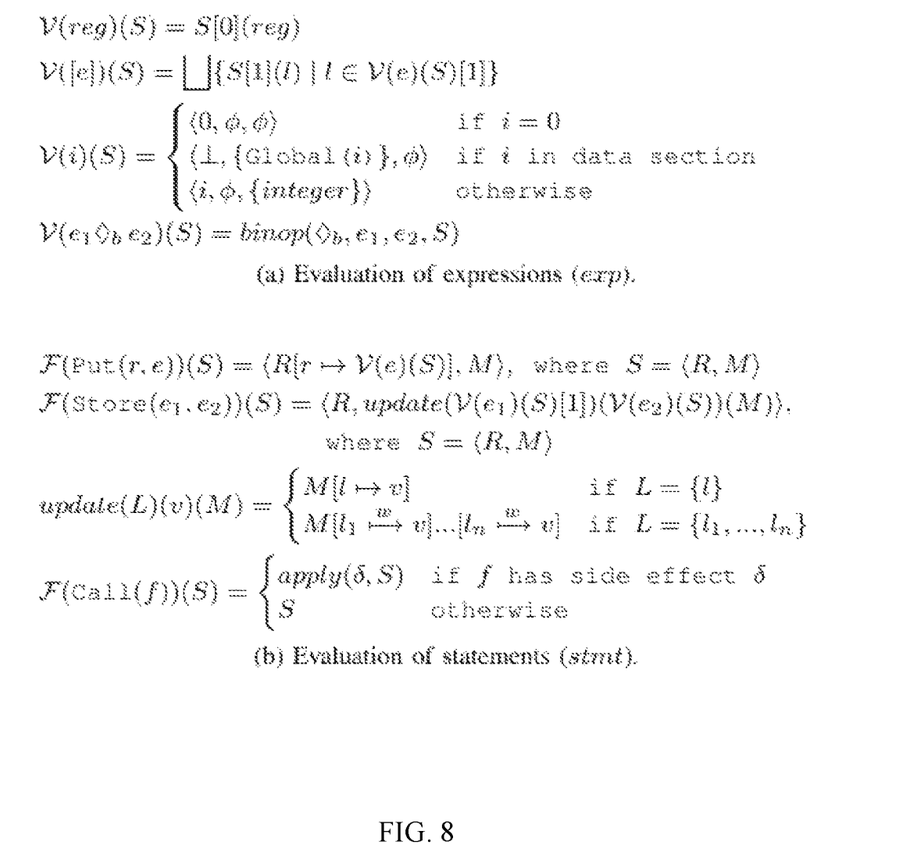

The type reasoner 110 according to an embodiment of the present invention may perform static analysis using an abstract interpretation technique. The abstract interpretation technique is one of the representative techniques of static analysis. As the abstract interpretation technique, the method disclosed in the non-patent document of "P. Cousot and R. Cousot, 'Abstract interpretation frameworks: A unified lattice model for static analysis of programs by construction or approximation of fixpoints,' in Proceedings of the ACM Symposium on Principles of Programming Languages, 1977, pp. 238-252" will be referenced. The abstract interpretation technique defines abstract domains and abstract semantics, and analyzes what happens in the program on the basis of the abstract domains and abstract semantics. FIGS. 7 and 8 express the abstract domains and abstract semantics used in a static analyzer.

For example, in analyzing the binary code using the abstract interpretation technique, an interval domain may be used as an abstract domain to analyze memory access, or the static analysis may track memory access using a constant offset. In an embodiment of the present invention, a method of tracking memory access using a constant offset may be used. Although this choice may cause the analysis result to miss some of the behaviors occurring in a target program (false negatives), the cases of falsely including the behaviors that do not occur in the program in the analysis result (false positives) may be reduced instead.

In addition, the use of the abstract domains and abstract semantics facilitates application of modular analysis to a binary code. Although many studies have used the modular analysis for source code analysis, the cases of successfully applying the modular analysis to a binary code are limited. When the conventional method of applying the abstract interpretation technique targeting the binary code is combined with the modular analysis, it is difficult to properly summarize memory updates that occur due to the function calls. This is since that the upper and lower limits of the interval domain are unclear in many cases. However, the static analyzer according to the present invention that does not use the interval domain may generate a summary including memory updates.

At the system call type inference 440 step of FIG. 4, the type reasoner 110 may infer type information of each system call by synthesizing parameter information passed to the system call on the basis of the summary information collected for each function. The type reasoner 110 may finally infer type information of each system call by acquiring information on the type of parameters passed to the system call on the basis of the summary information collected for each function.

When a parameter passed to the system call has a simple type such as an integer or a handle, or a parameter of an API function is directly passed, the type reasoner 110 may directly determine the type information of the system call parameter. On the other hand, when a pointer value indicating a memory area is passed to the system call as a parameter passed to the system call, the type reasoner 110 should also infer the type of the content pointed by the pointer with reference to an analyzed memory state. First, when the size of the memory space pointed by the pointer is passed as another parameter of the system call, it may be inferred that the content pointed by the pointer is an array. When this condition is not satisfied, the content pointed by the pointer is regarded as a structure, and the types are recursively inferred for the content stored in the memory and adopted as the types of the structure field. In this process, the pointer type of one piece of integer is regarded as the pointer type of the structure having the integer as a unique field. In the process of inferring the structure type, it is important to determine how much the structure is extended. To this end, in the embodiment of the present invention, the memory access pattern is observed through data flow analysis, and the range of the structure may be inferred based on this. As the data flow analysis, the method disclosed in the non-patent document of "A. V. Aho, M. S. Lam, R. Sethi, and J. D. Ullman, Compilers: Principles, Techniques, and Tools, 2nd edition. Addison Wesley, 2006" may be referenced.

A problem that may occur in the process of inferring type information of a system call is that when one system call is called from several points, type information of the system call may be inferred to be different at each of the points. Conventionally, when conflicting results are obtained, it is concluded that the type cannot be determined, whereas in the embodiment of the present invention, a type statistically observed at more points is selected. Through this method, fuzzing efficiency may be increased by providing type information of high probability to be correct, although not perfect, to the fuzzing module.

Figure 5:
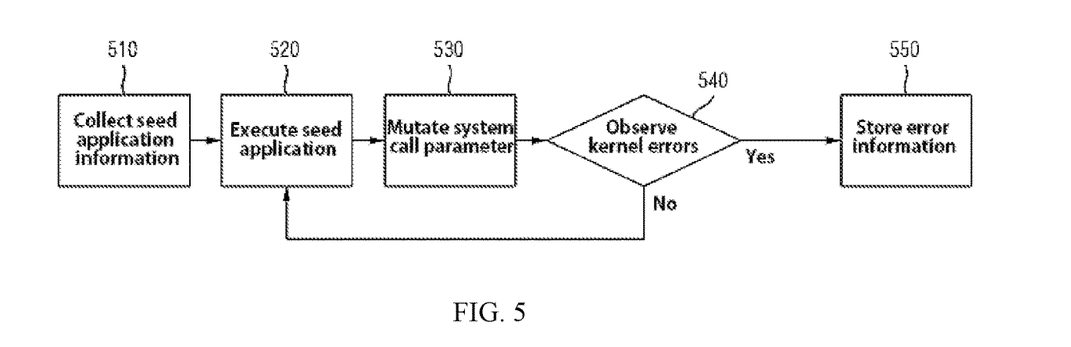
FIG. 5 is a view for explaining the operation of performing system call fuzzing in a fuzzing system according to an embodiment of the present invention.

FIG. 5 is a view for explaining the operation of performing system call fuzzing in a fuzzing system according to an embodiment of the present invention.

The type-based fuzzer 120 of the present invention may intercept system call parameters generated by executing a seed application and make a mutation thereof. The seed application may use certain software executed on the Windows operating system. When the seed application is executed, a great many system calls may be called internally to interact with the kernel.

The type-based fuzzer 120 may intercept the content of the called system call in the middle and operate in a way of mutating the values of the system call parameters. At this point, the type-based fuzzer 120 may mutate the call parameter values by using the type information of the system call. For example, when an integer type parameter is mutated, simply an integer value thereof needs to be mutated, whereas when a value of a pointer type parameter is mutated, the content stored at the location pointed by the pointer should be mutated. When an appropriate mutation is made considering the type information in this way, it is possible to test the kernel code and find errors more efficiently.

Referring to FIG. 5, the type-based fuzzer 120 may performed the steps of collecting seed application information 510, executing the seed application 520, mutating system call parameters 530, observing kernel errors 540, and storing error information 550.

At the step of collecting seed application information 510 of FIG. 5, the type-based fuzzer 120 may collect seed application information related to the number of system calls made by one execution of the seed application. The type-based fuzzer 120 may measure how many system calls are made on average by one execution of the seed application. Here, the measured information may be used to estimate the execution progress of the seed application at the subsequent step of mutating system call parameters 530. For example, when it is assumed that N (N is a natural number) system calls are made on average while the seed application is executed, and the seed application has called the M-th (M≤N) system call just before, it is a method of estimating the progress of application as MN at the called time point.

At the step of executing the seed application 520 of FIG. 5, the type-based fuzzer 120 may execute a given seed application. When the seed application needs to receive an input through a command line interface or a graphical user interface, an interface input may also be provided together. As the seed application is executed, system calls for interacting with the kernel may be called.

At the step of mutating system call parameters 530 of FIG. 5, the type-based fuzzer 120 may intercept the content of a system call generated by the seed application, and randomly mutate the parameter values of the intercepted content of the system call. For example, there are various techniques that can be used to intercept a system call, and a technique of using API functions provided by Windows for debugging or a technique of overwriting the system service descriptor table of the Windows kernel may be used. The type-based fuzzer 120 may stochastically mutate the system call parameters as it successfully intercepts the system call. For example, the type-based fuzzer 120 may determine a ratio for mutating the parameter values of the content of the system call on the basis of execution progress of the seed application, and mutate the system call parameters according to the determined ratio. An effective fuzzing strategy may be freely sought by utilizing the progress of the seed application. In other words, the type-based fuzzer 120 does not mutate all system call parameters, but may selectively mutate some of the system call parameters, and the ratio of the number of parameters to be mutated may be freely set. When a target for mutating the system call parameters is selected, the values of the selected system call parameters may be mutated using the type information of the system call.

At the step of observing kernel errors 540 of FIG. 5, the type-based fuzzer 120 may observe whether an error occurs in the kernel code as the values of the mutated system call parameters are passed to the kernel. When the parameters of the system call are mutated and passed to the kernel, an error may occur with a low probability while the kernel code processes abnormal inputs. When a kernel error does not occur and execution of the seed application is normally completed, the process may return to the step of executing the seed application 520 and repeat a new execution. On the contrary, when an error occurs in the kernel, the system is rebooted, and memory dump may be automatically generated.

At the step of storing error information 550 of FIG. 5, the type-based fuzzer 120 may store and report information on the kernel error when the kernel error and system rebooting are confirmed. A design of reporting the kernel error and returning to a previous step to continue fuzzing without terminating the process is also possible as needed.

Whether the type reasoner according to the present invention is able to correctly infer a parameter type of a system call of Windows may be tested on the 2018 April version of Windows 10. A total of 7 core Windows library files (ntdll.dll, kernelbase.dll, kernel32.dll, win32u.dll, gdi32.dll, gdi32full.dll, user32.dll) can be analyzed. In order to measure the accuracy of the type information of the system call inferred through the analysis, 64 system call functions documented on the Microsoft official website will be used as a benchmark. The 64 system call functions have a total of 326 parameters, and it may be measured how correctly the type reasoner proposed in the embodiment of the present invention may infer the types of the system call function parameters. As a result of the test, the type reasoner may correctly infer the types for 69% of the parameters and infer partially correct types for the remaining parameters. Seeing from the result, it may be expected to show superior accuracy even for the remaining system calls that have not been documented.

In addition, whether the type information of the system call obtained by the type reasoner may improve the fuzzing effect may be tested on the same 2018 April version of Windows 10. The type-based fuzzer has performed fuzzing for each of 8 seed applications for 48 hours. As a result, when type information is provided, 1.7 times more kernel crashes can be detected compared to a case where the type information is not provided.

Finally, it is possible to test whether the technique devised in the present invention may detect new errors that are unknown before in the latest version of Windows. As a result of testing the 2020 January version of Windows 10, i.e., the latest version at the time of the invention, a total of 11 errors are found. As a result of reporting the found errors to Microsoft, four of the errors are acknowledged as important security vulnerabilities and assigned with vulnerability management numbers (CVE-2020-0792, CVE-2020-1246, CVE-2020-1053, CVE-2020-17004). The experiment result shows that it is a technique that can effectively detect errors in the Windows kernel.

Although a person himself or herself does not analyze and identify type information of Windows system calls, system call fuzzing utilizing the type information may be performed.

In addition, as the type information is utilized for system call fuzzing, errors in the kernel code may be found more effectively.

The device described above may be implemented as hardware components, software components, and/or a combination of the hardware components and the software components. For example, the device and components described in the embodiments may be implemented using one or more general purpose or special purpose computers such as a processor, a controller, an arithmetic logic unit (ALU), a digital signal processor, a microcomputer, a field programmable gate array (FPGA), a programmable logic unit (PLU), a microprocessor, and any other devices capable of executing and responding to instructions. A processing device may execute an operating system (OS) and one or more software applications executed on the operating system. In addition, the processing device may also access, store, manipulate, process, and generate data in response to execution of the software. Although it has been described that one processing device is used in some cases for convenience of understanding, those skilled in the art will know that the processing device may include a plurality of processing elements and/or a plurality of types of processing elements. For example, the processing device may include a plurality of processors or one processor and one controller. In addition, other processing configurations, such as parallel processors, are also possible.

The software may include computer programs, codes, instructions, or a combination of one or more of those, and it is possible to configure a processing device to operate as desired or to independently or collectively issue a command to the processing device. The software and/or data may be embodied in any kind of machines, components, physical devices, virtual equipment, computer storage media or devices to be interpreted by the processing device or to provide instructions or data to the processing device. The software may be distributed to computer systems connected through a network to be stored or executed in a distributed manner. The software and data may be stored in one or more computer-readable recording media.

The method according to the embodiments may be implemented in the form of program instructions that can be executed through various computer means and recorded in computer-readable media. The computer-readable media may store program instructions, data files, data structures, and the like independently or in combination. The program instructions recorded in the media may be specially designed and configured for the embodiment, or may be known and available to those skilled in the art of computer software. Examples of the computer-readable recording media include magnetic media such as hard disks, floppy disks and magnetic tapes, optical media such as CD-ROMs and DVDs, magneto-optical media such as floptical disks, and hardware devices specially configured to store and execute the program instructions, such as ROM, RAM, flash memory, and the like. Examples of the program instructions include high-level language codes that can be executed by a computer using an interpreter or the like, as well as machine language codes such as those generated by a compiler.

Although the embodiments have been described above with reference to limited embodiments and drawings, various changes and modifications are possible from the above description by those skilled in the art. For example, an appropriate result may be achieved although the described techniques are performed in an order different from that of the method described above, and/or the described components of the systems, structures, apparatuses, circuits, and the like are coupled or combined in a form different from those of the method described above, or replaced or substituted by other components or equivalents.

Therefore, other implementations, other embodiments, and matters equivalent to the claims are also within the scope of the claims described below.

What is claimed is:

1. A method of fuzzing a kernel of a computer operating system performed by a fuzzing system, the method comprising the steps of:

inferring type information of a system call automatically using a library file provided by the computer operating system; and performing system call fuzzing on the basis of the type information of the system call obtained through the inferring step.

2. The method according to claim 1, wherein the computer operating system includes a Windows operating system that does not open a source code and type information of system calls, and the inferring step includes the step of receiving the library file provided by the Windows operating system, calling an API function defined in the received library file by an application, and performing a system call that transmits a request to the kernel through the called API function, and the library file provided by the Windows operating system is provided as a binary code of a compiled form.

3. The method according to claim 1, wherein the inferring step includes the step of inferring type information of a system call, to which each parameter of the API function is passed, through static analysis of a function call flow occurring in the library file provided by the Windows operating system.

4. The method according to claim 3, wherein the inferring step includes the step of converting the library file provided by the Windows operating system into an intermediate language form for static analysis.

5. The method according to claim 4, wherein the inferring step includes the step of detecting functions existing in the library file provided by the Windows operating system, and converting a machine code included in the detected functions into an assembly code.

6. The method according to claim 5, wherein the inferring step includes the step of identifying relation information between the detected functions and other functions called from each of the detected functions, generating a function call graph on the basis of the identified relation information, and determining an order to analyze a called function before a calling function on the basis of the generated function call graph.

7. The method according to claim 6, wherein the inferring step includes the step of analyzing behavior information including system calls and memory update occurring in each function, and generating a summary including the analyzed behaviors.

8. The method according to claim 7, wherein the inferring step includes the step of inferring type information of each system call by synthesizing parameter information passed to the system call on the basis of the summary information collected for each function.

9. The method according to claim 1, wherein the step of performing system call fuzzing includes the step of outputting an error result of searching for a kernel error using the acquired type information of the system call and a seed application, wherein the seed application is arbitrary software executed on the Windows operating system.

10. The method according to claim 1, wherein the step of performing system call fuzzing includes the step of collecting seed application information related to the number of system calls generated by one execution of the seed application.

11. The method according to claim 10, wherein the step of performing system call fuzzing includes the step of executing the seed application.

12. The method according to claim 11, wherein the step of performing system call fuzzing includes the step of intercepting content of the system call generated by the seed application, and randomly mutating parameter values of the intercepted content of the system call.

13. The method according to claim 12, wherein the step of performing system call fuzzing includes the step of determining a ratio for mutating the parameter values of the content of the system call on the basis of execution progress of the seed application.

14. The method according to claim 13, wherein the execution progress of the seed application is derived on the basis of an average number of system calls called while the seed application is executed and the number of system calls currently called by the seed application.

15. The method according to claim 12, wherein the step of performing system call fuzzing includes the step of mutating the parameter values of the intercepted content of the system call by utilizing the type information of the system call.

16. The method according to claim 12, wherein the step of performing system call fuzzing includes the step of passing the parameter values of the content of the mutated system call to the kernel, and observing whether an error occurs in a kernel code.

17. The method according to claim 16, wherein the step of performing system call fuzzing includes the step of repeating execution of the seed application when the kernel error does not occur and execution of the seed application is normally completed.

18. The method according to claim 16, wherein the step of performing system call fuzzing includes the step of rebooting the system and automatically generating memory dump when the kernel error occurs, and storing and reporting information on the kernel error when the kernel error and system rebooting are confirmed.

19. A non-transitory computer-readable recording medium storing a computer program that, when executed by a processor, cause the processor to execute the method of claim 1 for fuzzing a kernel of a computer operating system in a fuzzing system.

20. A fuzzing system comprising:
at least one processor; and memory having instructions stored thereon, which, when executed by the at least one processor, cause the at least one processor to:
automatically infer type information of a system call using a library file provided by a computer operating system; and
perform system call fuzzing on the basis of the type information of the system call obtained through the inference.

* * * * *